Patented Aug. 2, 1927.

1,637,868

UNITED STATES PATENT OFFICE.

WALTER A. MANSS, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING INDOPHENOL COMPOUNDS.

No Drawing.   Application filed December 14, 1923.   Serial No. 680,581.

This invention relates to the production of an indophenol and leuco indophenol by the condensation of ethyl-carbazole with para-nitrosophenol.

In U. S. Patent No. 966,092, a process is described for the production of indophenols by condensing the imino substituted derivatives of carbazole, viz N-alkyl or N-aryl carbazoles with p-nitrosophenol or analogous substances in sulphuric acid solution. The N-substituted carbazole is dissolved in cold 66° Bé. sulphuric acid and to this is added while stirring and cooling well, a solution of p-nitrosophenol in concentrated acid, the temperature preferably not being allowed to rise above 10° C.

I have now discovered that by carrying out this condensation in the manner hereinafter described, the yield and quality of the products obtained are markedly improved. When tested for purity, this new product is found to be practically completely soluble in an alcoholic polysulphide solution and leaves after filtration only a slight residue which is completely soluble in water. This new product, in addition, gives after treatment with an alcoholic polysulphide solution a much larger yield of a vat dye of exceptional brilliance of shade and with an unusually clear vat in the sodium hydrosulphite solution.

According to this invention, the characteristic features of the process are in the low temperature employed, viz, temperatures below −13° C. or about −15° C., and in the method of carrying out the condensation. The time or duration of the reaction is equally as important as the temperature. For instance, a decidedly better quality and better yield of product is obtained when the reaction takes only a few minutes, viz, 5 minutes, at this temperature than if the reaction persisted for 20 to 30 minutes. In order to carry out this reaction in the shortest possible time, it is necessary to previously cool the solutions of the reacting materials to such a point that the difference between this initial temperature and the allowable maximum temperature roughly corresponds to the temperature rise of the mixture resulting from heat of reaction. The result of this procedure is that the necessary time of condensation is reduced to a minimum since only a comparatively small amount of external cooling is required during the mixing of the two components. The initial temperatures which permit of this method of procedure are −42° to −45° C. and may be obtained, for example, by means of a refrigerating machine operating by the expansion of a suitable gas. The strength and amount of sulphuric acid, of course, must be such as to permit of cooling to these low temperatures without freezing.

In addition to the improvements in conditions for the condensation of ethyl-carbazole and nitrosophenol it has also been found technically advantageous to isolate the condensation product as leuco-indophenol instead of as the indophenol itself. It is well known that indophenols in general are unstable in the presence of dilute acids, whereas the reduced forms or leuco-indophenols are very stable. For this reason it is necessary when working with the indophenol to drown in water, filter and wash to neutrality very quickly or to drown in dilute alkaline solution such as ammonium hydroxide or sodium carbonate. Attainment of either of these aims technically is either relatively difficult or expensive.

The products to which my process are applicable, can be prepared, for example, as follows:

One part of ethyl-carbazole is dissolved in 8.0 parts of sulphuric acid of 96–97% strength at ordinary temperatures, and is then cooled to −42° C. to −45° C. At the same time, 0.631 part of para-nitrosophenol is added to 7.0 parts of cold sulphuric acid of the same strength in another tub and is there cooled to about −42° C. to −45° C. The ethyl-carbazole solution is then run into the nitrosophenol solution as rapidly as possible, viz, during about 5 minutes, care being taken to prevent the temperature rising above −15° C. The solution is then stirred for a short time (about 10 minutes) and is run simultaneously with a solution of 2.0 parts of 30% sodium sulphide in about 2 parts of water into a mixture of ice and water maintaining the temperature at about 5° C. When all is added, the mixture is heated to 60° C.–65° C., during which period, the indophenol changes from a purple to a yellowish green color being reduced by means of the hydrogen sulphide liberated to the stable leuco-indophenol. After cooling, the leuco indophenol is filtered, washed with water and dried.

If, instead of obtaining the leuco body, it is desired to obtain the indophenol, the condensation mixture is run into a mixture of ice and water below 5° C. and the product filtered off and washed free from the bulk of free sulphuric acid which the cake contains. The cake is then dumped into an alkaline bath, such as a solution of soda ash, etc., stirred until the mixture is homogeneous and is then filtered off, washed and dried as before. Since the indophenol is unstable in acids, the time factor must in this case be reduced to a minimum and all steps prior to its neutralization in soda ash must take place as rapidly as possible.

The above mentioned amounts of materials and strength of acid can, of course, be varied within certain limits.

The leuco-indophenol obtained is partly present as an acid sulphate which in no way interferes with the formation of the vat dye. As previously stated, the criterion for the purity of the product is its solubility in a definite amount of sodium polysulphide solution. The indophenol or leuco-indophenol prepared under these conditions gives a clear lemon yellow solution free from appreciable turbidity, when dissolved in water in the presence of caustic soda and sodium hydrosulphite. The products obtained give, after fusion with alcoholic polysulphide solution, a vat dye which is practically completely soluble in the sodium hydrosulphite vat with a pale lemon yellow color.

I claim:

1. The process of producing an indophenol which comprises condensing ethyl-carbazole with a nitrosophenol compound at a temperature below −13° C.

2. The process of producing an indophenol which comprises condensing an imino-substituted carbazole with a nitrosophenol compound at a temperature below −13° C.

3. The process of producing an indophenol which comprises mixing a sulphuric acid solution of a carbazole in which the N-hydrogen atom is replaced by a hydrocarbon radical, with a sulphuric acid solution of a nitrosophenol, and maintaining the temperature below −13° C. until condensation of the carbazole with the nitrosophenol is practically completed.

4. The process of producing an indophenol which comprises inducing a reaction between N-ethyl-carbazole and para-nitrosophenol in a medium of concentrated sulphuric acid, and preventing the temperature of the reacting mixture from exceeding −15° C. until the condensation of said substances is practically completed.

5. The process which comprises adding, over a period of a few minutes, a sulphuric acid solution of N-ethyl-carbazole to a sulphuric acid solution of p-nitroso-phenol, said solutions just before being brought together having temperatures such that the heat of the reaction will not raise the temperature of the resulting mass to above −15° C.

6. The process which comprises mixing a solution of N-ethyl carbazole with a solution of para-nitrosophenol in the presence of a condensing agent, said solutions just before mixing being at temperatures such that the heat of reaction produced during said mixing will raise the temperature of the reaction mass during the mixing period to a value less than −13° C.

7. The process which comprises mixing a concentrated sulphuric acid solution of an imino substituted carbazole with a concentrated sulphuric solution of para-nitrosophenol, said solutions before mixing being at such low temperatures that the condensation will be practically completed without the heat of reaction having raised the temperature of the reaction mass above −15° C.

8. The process which comprises mixing a concentrated sulphuric acid solution of ethyl-carbazole with a concentrated sulphuric solution of para-nitrosophenol, said solutions before mixing being at temperatures of between about −42 and −45° C.

9. The process which comprises adding over a short period a concentrated sulphuric acid solution of ethyl-carbazole at a temperature of between about −42 and −45° C., to a concentrated sulphuric acid solution of para-nitrosophenol at a temperature of between about −42 and −45° C. as rapidly as possible while preventing the temperature of the reaction mass from rising above −15° C., stirring the resulting mixture for a few minutes, adding it, concurrently with a water solution of sodium sulphite to such a mixture of ice and water that the temperature will be maintained at about 5° C., heating the resulting mass to a temperature of from about 60 to 65° C. until the indophenol formed has been reduced to the leuco-indophenol, and then cooling the mass and filtering off the leuco-indophenol.

10. In a process of producing a leuco-indophenol in which an alkyl carbazole is condensed with a nitrosophenol, said reagents before said condensation being at a temperature not substantially above −42° C., the step which comprises treating the reaction mass resulting from the condensation operation with a reducing agent at such a temperature that the resulting mixture will be at substantially 5° C.

11. A procedure as set forth in claim 10 in which the carbazole is N-ethyl-carbazole.

12. The process which comprises condensing N-ethyl-carbazole with para-nitrosophenol at a temperature not exceeding about −15° C. in the presence of a condensing agent, reducing the resulting condensation product to the leuco condition, and recovering the thus formed leuco-indophenol from the resulting reaction mixture.

13. The process which comprises condensing an imino-substituted carbazole with a nitrosophenol at a temperature below −13° C. in the presence of a condensing agent, and treating the resulting mixture with a reducing agent to convert the unstable indophenol thus formed into the corresponding stable leuco-indophenol.

14. The process which comprises condensing an N-alkyl-carbazole with para-nitrosophenol at a temperature not exceeding about −15° C. in a medium of concentrated sulphuric acid, treating the resulting mixture with a reducing agent to form the stable leuco-indophenol, and recovering the latter.

In testimony whereof I affix my signature.

WALTER A. MANSS.